(12) United States Patent
Thompson et al.

(10) Patent No.: US 11,421,632 B2
(45) Date of Patent: Aug. 23, 2022

(54) AIR FILTER ADAPTER

(71) Applicant: B&M Racing & Performance Products Inc., Bowling Green, KY (US)

(72) Inventors: Lee Nathan Thompson, Hayden, ID (US); Ryan Patrick Ringel, Post Falls, ID (US)

(73) Assignee: B&M Racing & Performance Products Inc., Bowling Green, KY (US)

( * ) Notice: Subject to any disclaimer, the term of this patent is extended or adjusted under 35 U.S.C. 154(b) by 196 days.

(21) Appl. No.: 16/920,054

(22) Filed: Jul. 2, 2020

(65) Prior Publication Data

US 2021/0010447 A1    Jan. 14, 2021

Related U.S. Application Data

(60) Provisional application No. 62/872,520, filed on Jul. 10, 2019.

(51) Int. Cl.
*F02M 35/02* (2006.01)
*F02M 35/024* (2006.01)

(52) U.S. Cl.
CPC ........... *F02M 35/02416* (2013.01); *F02M 35/02483* (2013.01); *B01D 2279/60* (2013.01)

(58) Field of Classification Search
CPC ....... F02M 35/02416; F02M 35/02483; F02M 35/0218; B01D 2279/60; B01D 46/2411; B01D 2265/05; B01D 2275/201
See application file for complete search history.

(56) References Cited

U.S. PATENT DOCUMENTS

| | | | | |
|---|---|---|---|---|
| 2,634,821 A | * | 4/1953 | Chipley | B01D 50/20 55/330 |
| 2,697,523 A | * | 12/1954 | Bloksma | B01D 46/48 210/166 |
| 3,527,027 A | * | 9/1970 | Knight | B01D 46/0031 55/487 |
| 4,681,178 A | | 7/1987 | Brown | |
| 4,802,902 A | | 2/1989 | Bauerle | |
| 4,929,260 A | | 5/1990 | Bauerle | |
| 5,409,514 A | * | 4/1995 | Ragusa | B01D 46/0004 55/319 |
| 5,958,096 A | * | 9/1999 | Yee | B01D 46/0002 55/517 |

(Continued)

FOREIGN PATENT DOCUMENTS

AU    2002340071    6/2003
AU    2003287482    7/2004

(Continued)

OTHER PUBLICATIONS

Holley Performance Products Catalogue—2017 New & Hot Products (Year 2016).

(Continued)

*Primary Examiner* — Hung Q Nguyen
(74) *Attorney, Agent, or Firm* — Middleton Reutlinger

(57) ABSTRACT

Present embodiments relate to an air filter adapter for use with open style engine air filters. More particularly, but without limitation, present embodiments relate to a filter adapter having a hydrocarbon trap positioned within the adapter.

18 Claims, 9 Drawing Sheets

(56) References Cited

U.S. PATENT DOCUMENTS

| | | | |
|---|---|---|---|
| 6,837,228 B2 | 1/2005 | Baasch | |
| 6,901,888 B2 | 6/2005 | Baasch | |
| 6,913,210 B2 | 7/2005 | Baasch | |
| 6,997,401 B2 | 2/2006 | Baasch | |
| D574,852 S | 8/2008 | Grant | |
| 7,533,661 B2 | 5/2009 | Baasch | |
| 7,867,311 B1 * | 1/2011 | Connor | B01D 46/0002 55/DIG. 20 |
| D654,094 S | 2/2012 | Dralle | |
| 8,701,896 B2 * | 4/2014 | Levitt | B04C 3/06 210/512.1 |
| D794,681 S | 8/2017 | Newman | |
| D794,682 S | 8/2017 | Newman | |
| 9,861,922 B1 | 1/2018 | Townsend | |
| 9,987,580 B2 | 6/2018 | Townsend | |
| D824,425 S | 7/2018 | Townsend | |
| D841,694 S | 2/2019 | Tomlinson | |
| 10,385,811 B2 | 8/2019 | Newman | |
| D889,925 S | 7/2020 | Tipton | |
| D892,865 S | 8/2020 | Palkic | |
| 2004/0065206 A1 * | 4/2004 | Walker, Jr. | B01D 46/4236 96/417 |
| 2004/0094111 A1 | 5/2004 | Concialdi | |
| 2006/0288673 A1 * | 12/2006 | Wimmer | F02M 35/02483 55/385.3 |
| 2009/0107340 A1 * | 4/2009 | Niakan | B01D 46/0036 96/135 |
| 2018/0171948 A1 * | 6/2018 | McClelland | F02M 35/10144 |

FOREIGN PATENT DOCUMENTS

| | | |
|---|---|---|
| AU | 201712296 | 5/2017 |
| AU | 201911579 | 4/2019 |
| AU | 201911581 | 4/2019 |
| AU | 2015338922 | 11/2019 |
| AU | 202012815 | 8/2020 |
| DE | 10393644 | 12/2005 |
| EP | 3309382 | 4/2018 |
| GB | 2409239 | 10/2012 |

OTHER PUBLICATIONS

U.S. Appl. No. 62/872,520, filed Jul. 10, 2019 titled Air Filter Adapter.
Design U.S. Appl. No. 29/597,917, filed Mar. 21, 2017 titled Adapter.
Design U.S. Appl. No. 29/738,260, filed Jun. 16, 2020 titled Adapter.
Design U.S. Appl. No. 29/760,734, filed Dec. 3, 2020 titled Adapter.
Design U.S. Appl. No. 29/755,373, filed Oct. 20, 2020 titled Manifold Adapter.
Australian Design Application No. 202112133 filed Apr. 14, 2021 titled Manifold Adapter.
Australian Design Application No. 201910220 filed Jan. 14, 2019 titled Pump Adapter.
Design U.S. Appl. No. 29/710,141, filed Oct. 21, 2019 titled Pump Adapter.
Design U.S. Appl. No. 29/710,142, filed Oct. 21, 2019 titled Pump Adapter.
U.S. Appl. No. 16/553,619, filed Aug. 28, 2019 titled Pump Adapter.
U.S. Appl. No. 62/727,716, filed Sep. 6, 2018 titled Pump Adapter.
Design U.S. Appl. No. 29/713,628, filed Nov. 18, 2019 titled Throttle Body Adapter.
Australian Application No. 2017245279 filed Oct. 9, 2017 titled Mating Interface Between Air Intake Housing and Air Filter.
Radium Engineering, 20-0145 Fuel Pump Inlet Adapter Installation Instructions, Sep. 21, 2018 [publication date retrieved from Internet Wayback Machine on Oct. 8, 2019].
www.efihardware.com, Walbro In Tank Fuel Pump Extension Kit, Mar. 31, 2015 [publication date retrieve from Internet Wayback Machine on Oct. 8, 2019].

* cited by examiner

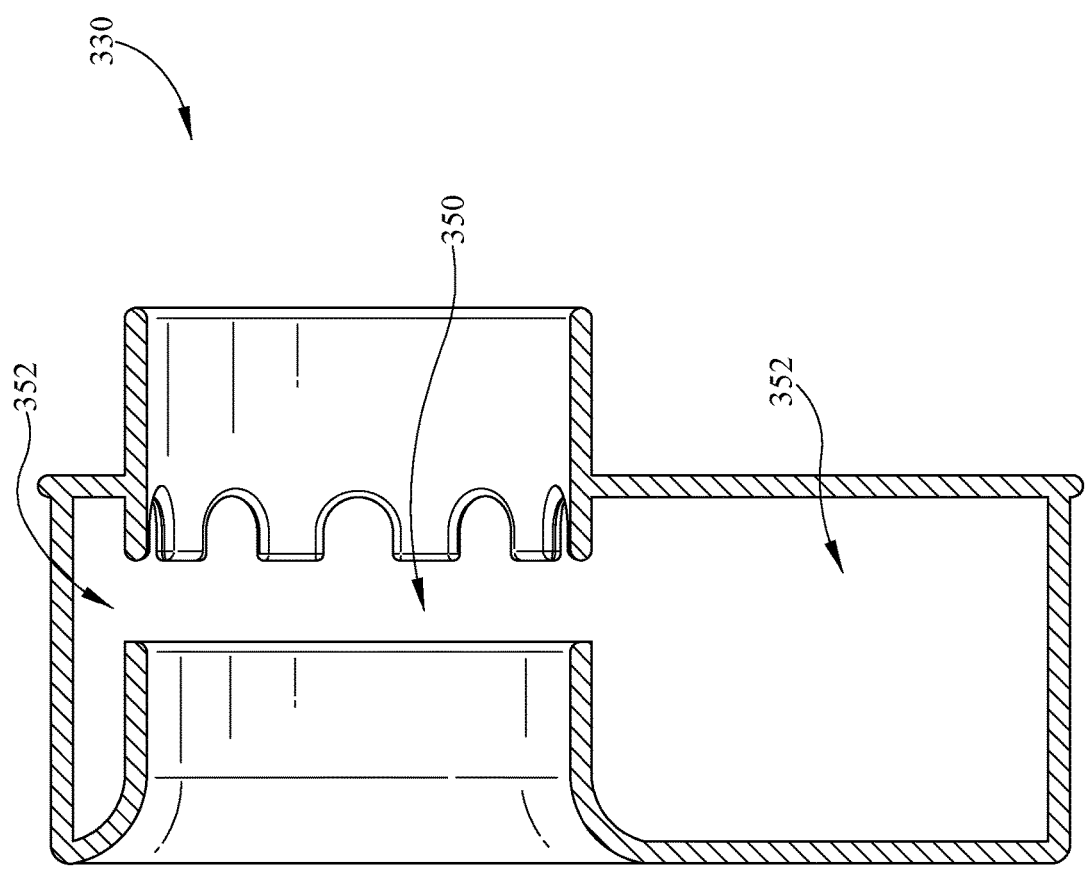

AIR FILTER ADAPTER

CLAIM TO PRIORITY

This non-provisional patent application claims priority to and benefit of, under 35 U.S.C. § 119(e), U.S. Provisional Patent Application Ser. No. 62/872,520, filed Jul. 10, 2019 and titled "Air Filter Adapter", all of which is incorporated by reference herein.

BACKGROUND

1. Field of the Invention

Present embodiments relate to an air filter adapter. More particularly, but without limitation, present embodiments relate to a filter adapter having a hydrocarbon trap positioned within the adapter.

2. Description of the Related Art

Air filters are utilized to remove particulate from an air flow entering an engine intake manifold. These air filters may be connected to air flow flexible conduit or hard piping to move air to a desired location for delivery to a combustion area.

During operation of an internal combustion engine, air flow may be drawn in through the filter and through an air intake into a manifold and delivered to the combustion chambers of an engine for mixing with fuel and providing combustion.

Unfortunately, when an engine is turned off, hydrocarbons associated with the excess, unburned fuel remaining in the intake path will vaporize and may move in a reverse direction from the normal air flow of the engine operation. That is, fuel vapor may move from the air intake manifold toward the air filter. This leads to hydrocarbons being emitted from the engine intake manifold and through the filter to the atmosphere. Obviously, the release of hydrocarbons into the atmosphere is a contributor to air pollution. Some manufacturers have attempted to resolve this condition by enclosing the air box wherein the filter may be located. However, this is not always an acceptable solution.

It may be desirable to limit this egress of vaporized fuel from the intake manifold through the filter into the atmosphere in order to reduce evaporative emissions of the hydrocarbon.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

A filter adapter is provided which allows for connection of an open-type or enclosed air filter for an internal combustion engine and further comprises a trap which allows for absorption of vaporized hydrocarbons which may travel from the intake manifold to the air filter when the engine is turned off. The hydrocarbon trap therefore captures a desirable amount of the vaporized fuel before such becomes an evaporative emission from the internal combustion engine.

According to some embodiments, a filter adapter for use with an open filter comprises an outer wall and an inner wall, an inlet at one end of the inner wall and an outlet at a second end of the filter adapter, a gap located along the inner wall. The gap allows access to a trap between the inner wall and the outer wall and an absorptive material is disposed in the space.

Some optional embodiments may be used alone or in various combinations with the filter adapter. For example, the inner wall may have a first portion and a second portion. The filter adapter may further comprise an axial airflow direction between the inlet and outlet. The trap may have an annular shape extending about the inner wall. The inlet may have a first diameter and the outlet having a second diameter. The filter adapter may further comprise the inlet at a first end of the inner wall and the outlet formed by a rear cover. The filter adapter may further comprise a plurality of scallops in one of the first portion or the second portion of the inner wall. The scallops may be disposed on the inner wall adjacent to the gap. The filter adapter may further comprise a housing having a forward cover and a rear cover. The filter adapter wherein one of a first portion or a second portion of the inner wall extends from the rear cover. The filter adapter may further comprise a transition between the outer wall and the inner wall. The inner wall may be linear or curved. The absorptive material may be a hydrocarbon absorbing sheet. The filter adapter wherein the gap may be formed by walls which are offset in a radial direction. The filter adapter may be asymmetrical in shape.

According to some embodiments, the method of housing an absorptive material may comprise providing an adapter for an air filter having an inlet and an outlet, providing a connection location on the adapter for an airflow conduit, moving air flow through the air filter and through an interior of the adapter, positioning a hydrocarbon absorptive material in the adapter and within a trap, and absorbing hydrocarbon vapors through a gap disposed along an inner wall of the adapter when an internal combustion engine is turned off.

According to some embodiments, the air intake for an internal combustion engine may comprise an open style filter having a filter media and an outlet for air having passed through the media, a filter adapter having a forward cover which engages the outlet, and a trap disposed within the filter adapter between an outer wall and an inner wall wherein a hydrocarbon absorptive material is disposed, a gap disposed along an inner wall allowing access to the trap and hydrocarbon absorptive material.

Optionally, the filter adapter may be positioned at least partially in the open style filter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims, and drawings included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of an air filter adapter will now be described by way of examples. These embodiments are not to limit the scope of the claims as other embodiments of an air filter adapter will become apparent to one having ordinary skill in the art upon reading the instant description. Non-limiting examples of the present embodiments are shown in figures wherein:

DETAILED DESCRIPTION

Figure 1:
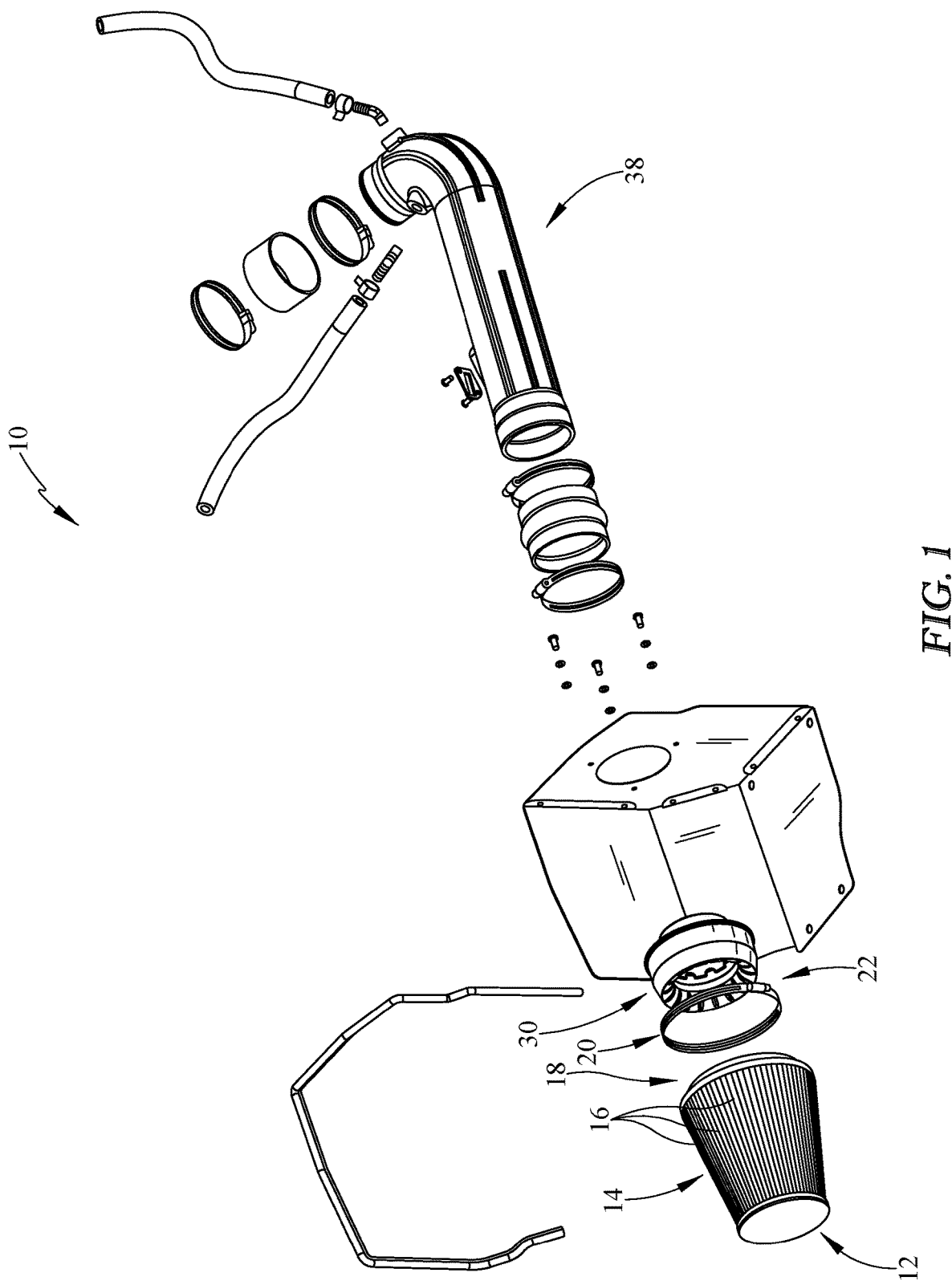
FIG. 1 is an exploded assembly view of an air intake system including a filter and filter adapter of the instant embodiments.

It is to be understood that an air filter adapter is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Referring now to FIGS. 1-9, present embodiments provide a filter adapter for use with an air intake of an internal combustion engine. The filter adapter provides a connection for a filter as well as a connection for air conduit, flexible or rigid, in order to filter particulate from air entering a vehicle engine for combustion. The filter adapter also provides an integral trap so that vaporized hydrocarbons that may back out of an intake manifold toward the filter, are captured on a hydrocarbon absorbing material, such as a sheet, which may be disposed within in the hydrocarbon trap of the filter adapter.

Referring now to FIG. 1, an air intake assembly 10 is provided in exploded perspective view. Starting at a first end of the assembly 10, a filter 12 is provided. The filter 12 may take various shapes and according to some illustrative and non-limiting embodiments, the filter 12 may be conical or frusto-conical in shape, but other shapes may be utilized as well. The filter 12 may have a plurality of pleats 16 to increase filter surface area and which extend about or between a frame such that air moves through the filtration pleats 16 to the inside of the filter 12 for subsequent passage through the air intake assembly 10. The filter media 14 may be defined by any of various known medias which are typically utilized with air filtration for combustion engines. As the filter media 14 and pleats 16 define the inlet for the filter 12, through which air enters, an end of the filter 12 may define an outlet 18. The filtered air passes through the outlet 18 toward the filter adapter 30. As one skilled in the art will recognize, the clamp 20 is tightened to reduce the circumference and increase force on the filter 12 and adapter 30. Various clamps may be used.

A clamp 20 is shown disposed between filter adapter 30 and the filter 12. The clamp 20 may be a screw clamp or other retaining structure which retains the filter 12 on a surface of the filter adapter 30. The illustrative clamp may, for non-limiting example, be a screw clamp having a screw arrangement 22 which allows tightening of the clamp 20 on or near the outlet 18 of the filter 12 and against an outer surface 32 (FIG. 3) of the filter adapter 30.

Figure 2:
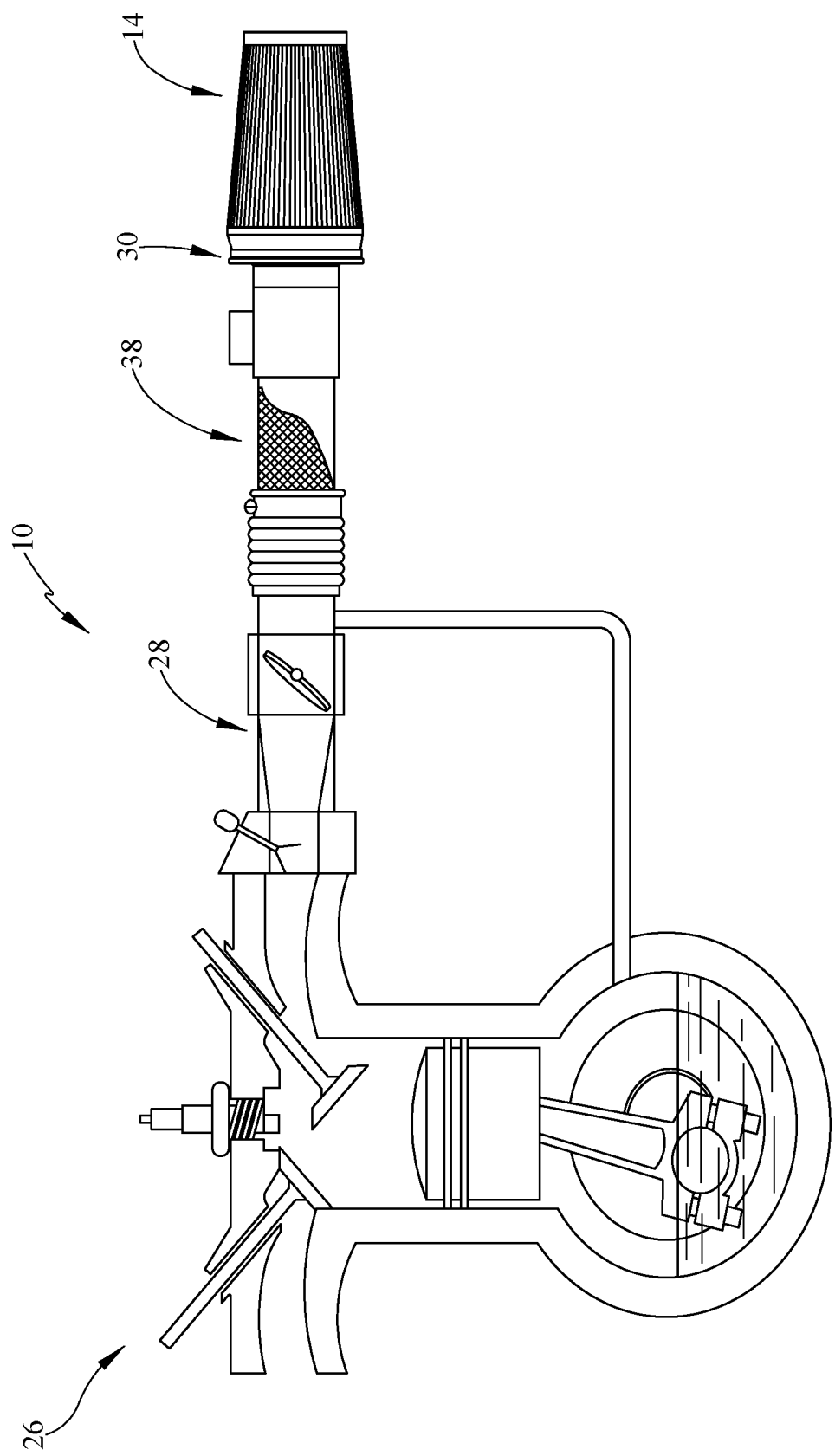
FIG. 2 is a schematic view of a combustion engine and the air intake.

In addition to connection of the filter 12, the filter adapter 30 also provides for connection for to air conduit 38 which may be flexible or rigid tubing or piping to the intake manifold of the internal combustion engine 26 (FIG. 2). A plurality of additional structures are shown which may be utilized for connection of the conduit to both the filter adapter 30 and to the intake manifold. For example, clamps, couplings and other connectors may be utilized in making the connection between the adapter 30 and the conduit 38, all of which may vary due to the engine and adapter location relative thereto.

With reference to FIG. 2, a schematic view of the air intake assembly 10 is shown with a schematic internal combustion engine 26. The schematic view shows the air filter 12 which is connected to air conduit 38 and ultimately extends to an air intake manifold 28 of the internal combustion engine 26. During engine operation, air flows through the filter 12 and is mixed with the vaporized fuel in the internal combustion engine 26 as one skilled in the art will understand.

As the schematic view depicts, the instant air filter 12 is an open-type or unenclosed filter, as opposed to filters which are located in a closed box, or enclosed. As a result, the open filter 12 may allow for evaporative loss of hydrocarbons which migrate to the filter from the air intake manifold 28. However, this view shows the capability of unburned fuel or air fuel mixture to reverse direction when an engine is turned off and moved toward the air filter 12. At this location, the unburned hydrocarbon or fuel air mixtures may evaporate through the filter 12.

Figure 3:
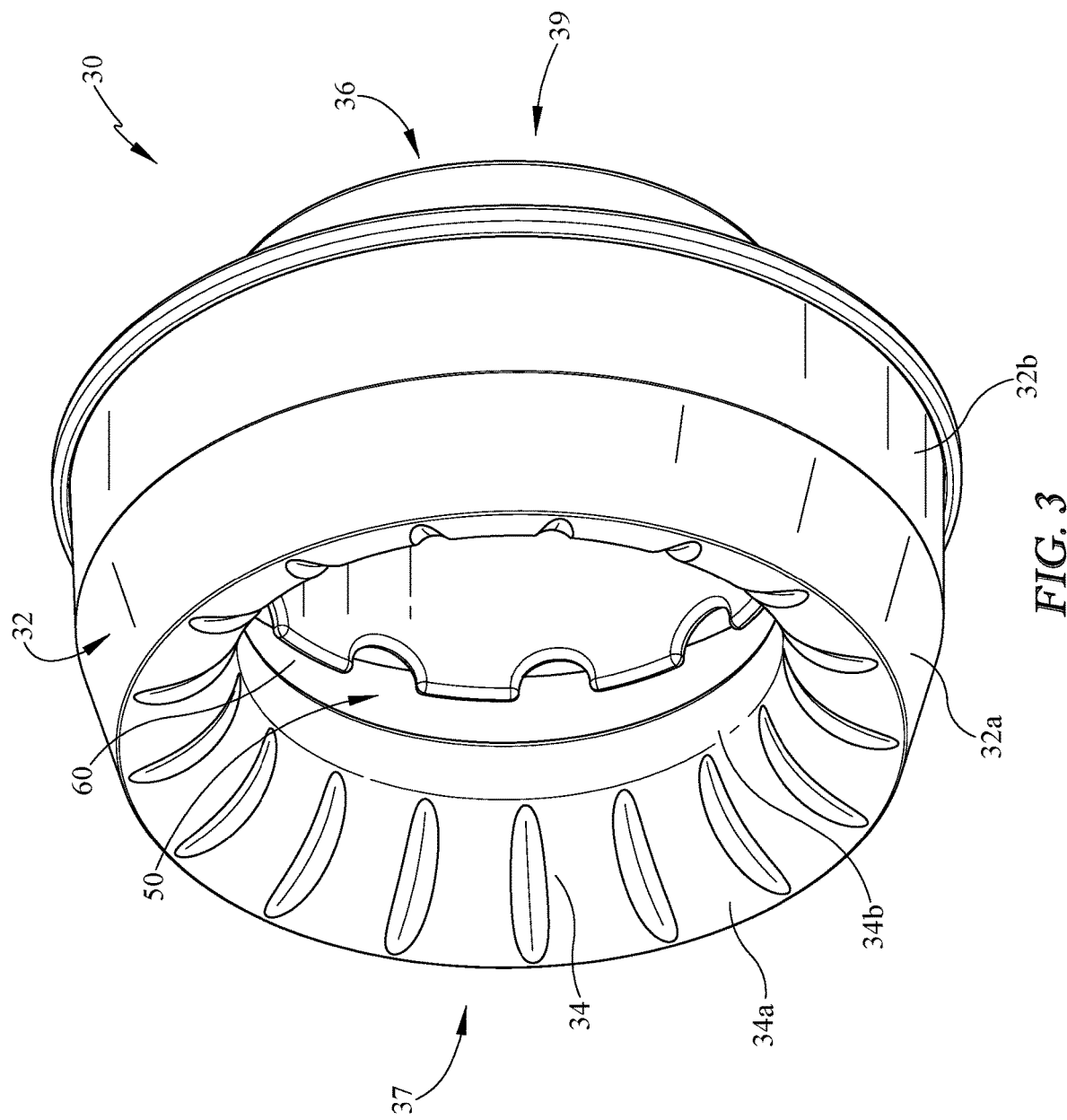
FIG. 3 is a perspective view of an illustrative embodiment of a filter adapter.

Referring now to FIG. 3, a perspective view of an illustrative filter adapter 30 is depicted. The filter adapter 30 allows for air flow in the left to right direction in the illustrative example during engine on operation. For purpose of orientation of this description, but not any limiting reason, the left side of the adapter 30 is the forward end and the right side is the rearward end as related to air flow during engine operation. The filter adapter 30 may comprise a one piece construction or a two or more piece construction. The filter adapter 30 may be formed of injection molded plastic according to some embodiments. In the instant example, the adapter 30 comprises a forward cover 31, which may define an inlet 37 for the adapter 30, and a rearward cover 36, which may define an outlet 39 for the filter adapter 30. The forward cover 31 comprises an outer wall which may be defined by at least one wall or in the instant example, a first portion 32a and a second portion 32b. In some embodiments, the first portion 32a may be of varying diameter, for example may be tapered linearly or may be curved but is of a smaller forward diameter as to as more easily receive and guide the air filter 12. This first portion 32a may define a transition. The air filter 12 may be slidably moved over the first portion 32a toward the second portion 32b and clamped or otherwise retained to the filter adapter 30. The second portion 32b may be cylindrical in shape but other shapes may be utilized.

The air filter adapter 30 further comprises an inner wall 34 having a first portion 34a and a second portion 34b. At the forward end of the outer wall 32, the inner wall first portion 34a joins the outer wall 32. Moving rearward, the inner wall first portion 34a tapers or may be radiused inwardly to a second portion of the inner wall 34b. Thus, the first portion 34a changes from a larger diameter to a smaller diameter at the second portion 34b.

Also depicted in the instant figure, the rear cover 36 is provided for the filter adapter 30. The rear cover 36 engages a rearward edge of the forward cover 31 and reduces from the diameter of the outer wall 32 to a smaller diameter which is connectable to the air conduit 38 (FIG. 1). The rear cover 36 includes a portion of the inner wall 34 which is separated from the second portion 34b by a gap 50.

Also shown within the air filter adapter 30 is the gap 50 which is disposed between a rear edge of the inner wall 34 and a forward edge of the inner wall of the rear cover 36. The gap 50 may be defined by the two adjacent edges. In some embodiments, the forward edge may have a plurality of scallops 56 to increase the available surface area of the gap 50. Alternatively, the surfaces of inner wall 34 may be continuous and have a plurality of perforations to allow air flow through the inner wall 34 and the internal portion or trap 52 of the air filter adapter 30. The gap 50 may be any of a plurality of opening(s), slot(s), slit(s), aperture(s), hole(s), perforation(s), pathway(s), or space(s) that allow air flow to move from within the inner surfaces of the filter adapter 30 into a trap 52 between the outer wall 32 and the inner wall 34.

Within the trap 52, is a hydrocarbon absorptive material 60. As the vaporized hydrocarbons reach this area of the filter adapter 30, the heavier weight of the hydrocarbons moves radially outwardly and are able to pass through the gap 50 and into the trap 52. In this area, the hydrocarbons may be absorbed by the hydrocarbon absorptive material 60. The material 60 may take various forms and according to some non-limiting embodiments may be in a sheet form.

Figure 4:
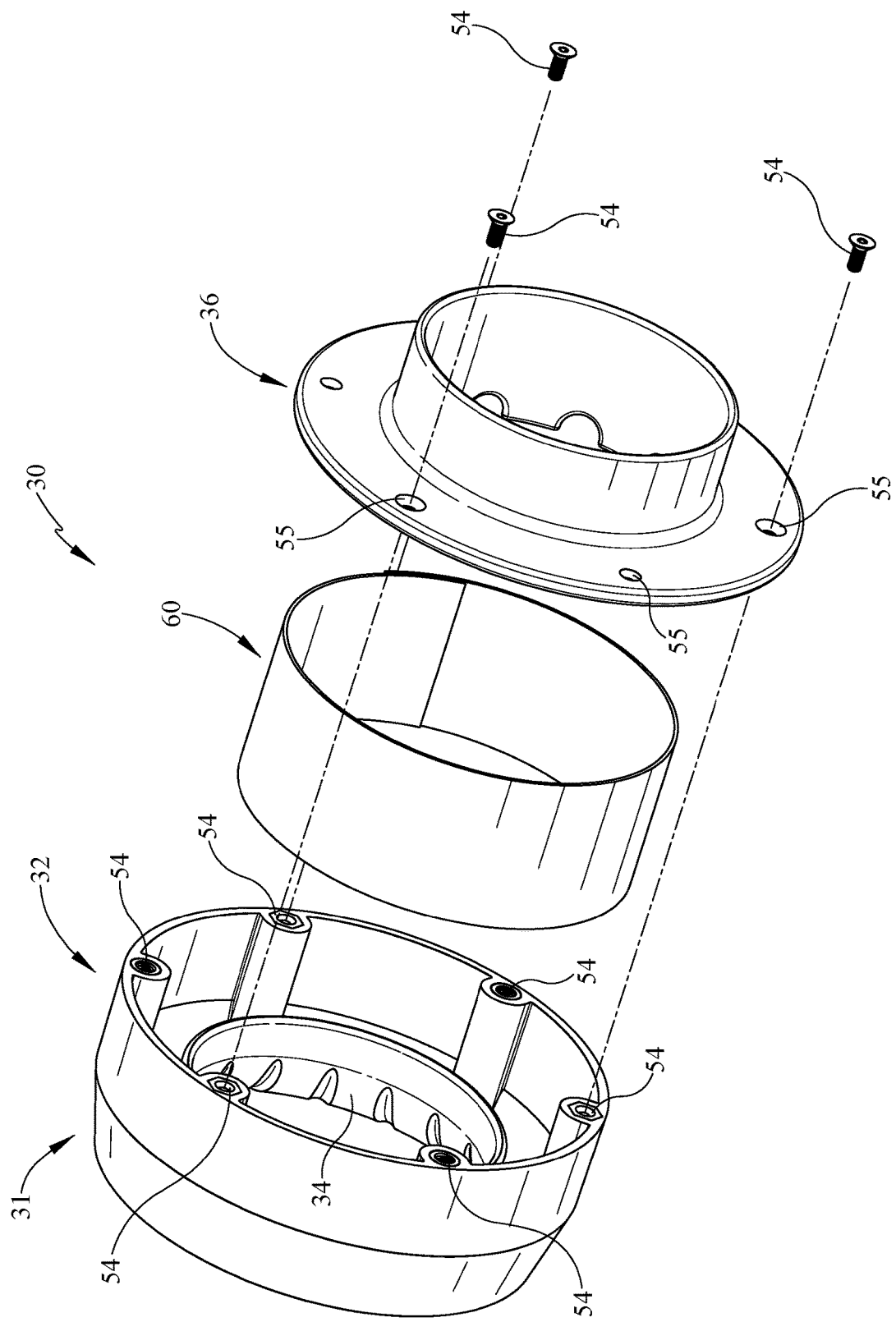
FIG. 4 is an exploded perspective view of the filter adapter of FIG. 3.

With additional reference to FIG. 4, the assembled view of FIG. 3 is exploded for ease of understanding and improved explanation. The filter adapter 30 has a housing that is generally defined by the forward cover 31 and the rear cover 36. At the left hand side of the figure, the forward cover 31 is shown having the outer wall 32 and the inner wall 34 extending from near a forward edge of the outer wall 32. At the rearward end of the forward cover 31, a plurality of fastener apertures 54 may be utilized in combination with corresponding apertures 55 on the rear cover 36 and the plurality of fasteners 54. The rear cover 36 may be attached in other manners such as snap fit, interference fit, or other ways and a sealing engagement is desirable. In some embodiments, the airflow enters the forward cover 31 and exits the rear cover 36 when the vehicle engine is running.

Between the forward cover 31 and the rear cover 36 is the trap 52 wherein the hydrocarbon absorptive material 60 may be positioned. The hydrocarbon absorptive material 60, for example sheet or media, may be, according to some illustrative, non-limiting embodiments, Ingevity ACS 310X. Other absorptive materials may be utilized and this is merely one example. The hydrocarbon absorptive material 60 is shown in cylindrical shape and is shaped in size to fit between the forward cover 31 and the rear cover 36. The hydrocarbon absorptive material 60 may have notches to provide clearance for the bosses having fastener apertures 54. Also depicted, is the filter adapter 30. The filter adapter 30 may vary in shape and accordingly, the hydrocarbon absorptive material 60 may also vary in shape but should fit between the outer wall 32 and the inner wall 34 of the forward cover 31.

Also shown in this figure, the rear edge of the inner wall 34 is positioned at a first planar location and the rear edge of the outer wall 32 is shown at a second planar location, which differs from the first planar location. The rear cover 36 is connected at this second planar location. Accordingly, this location between the two planes defines the gap 50 (FIG. 3). With this gap 50 defined between the conduit lip 59 of the rear edge of the inner wall 34, access is provided to an interior volume or space, generally referred to as the trap 52, between the outer wall 32 and the inner wall 34 wherein the hydrocarbon absorptive material 60 may be located.

Figure 5:
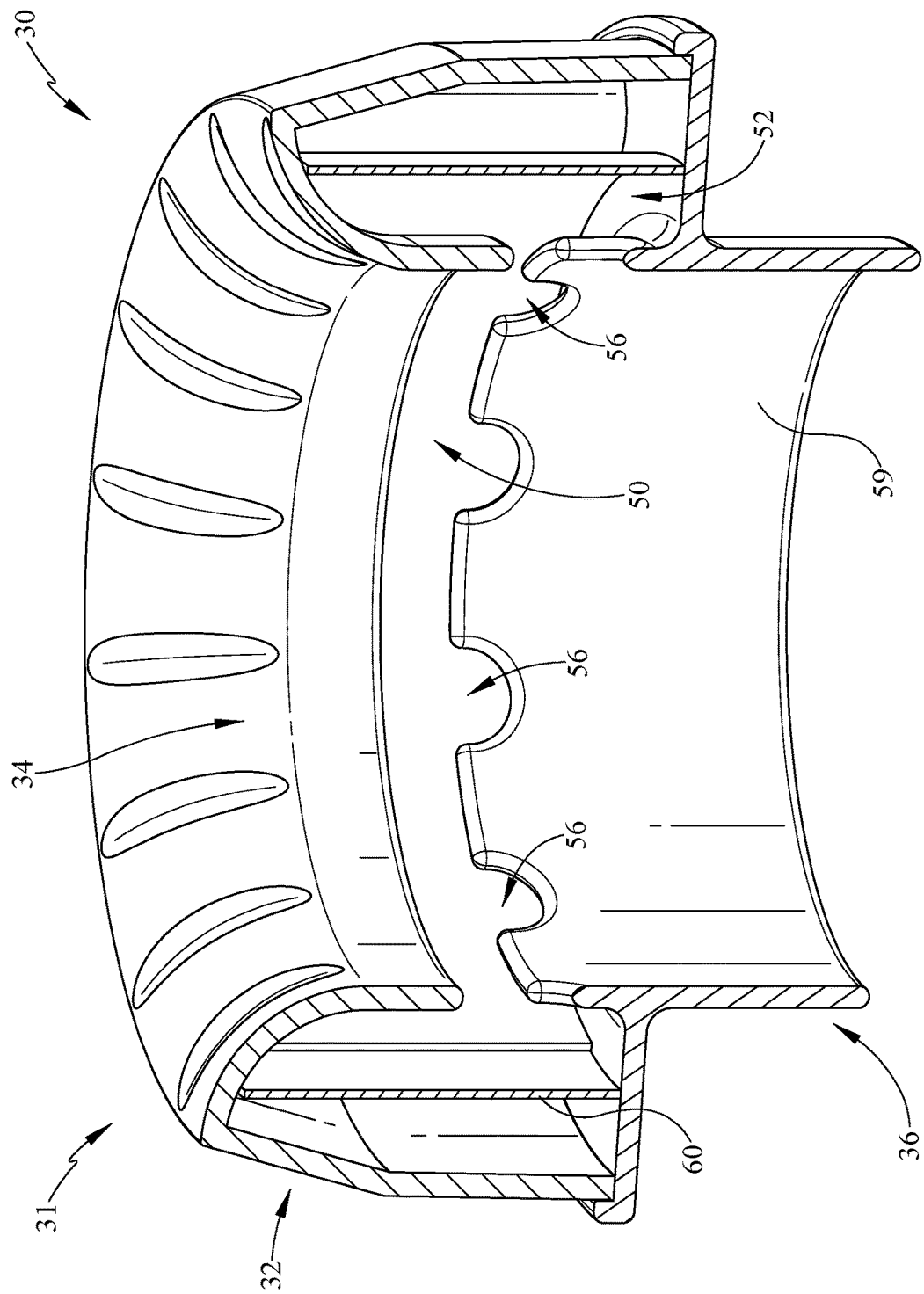
FIG. 5 is a section perspective view of filter adapter revealing the hydrocarbon trap.

With further reference to FIG. 5, a sectioned perspective view of the assembled filter adapter 30 is depicted. In this view, the section cut makes the gap 50 and the trap 52 formed between the forward cover 31 and the rear cover 36 visible. As depicted, the conduit lip 59 may have a plurality of scallops 56 which, along with the rear edge of the wall 34, define the gap 50. Any number of structures, holes, apertures, or the like, may be used to increase air flow passing along the inner wall 34 and the inner surface of the conduit lip 59 access to the trap 52. The design of the scallops 56 and the material extending between the scallops 56 also serves as a retaining feature of the hydrocarbon absorptive material 60 within the volume and further inhibiting the hydrocarbon absorptive material 60 from being vacuum sucked into the air assembly toward the intake manifold of the internal combustion engine 26 (FIG. 2).

The trap 52 is generally a volume between the rear cover 36 and the forward cover 31 and also may be defined between the inner wall 34 and the outer wall 32. The trap 52 may be of various shapes and is annular in the depicted embodiment. The trap may also be oval shaped but these are merely illustrative and not limiting. This volume allows positioning of the hydrocarbon absorptive material 60 therein. Again, while the embodiment of the gap 50 is shown as having a first edge and a second edge, having a plurality of scallops 56, this is merely illustrative of one way of increasing surface area of the gap 50, while maintaining structural rigidity necessary for the filter adapter 30. However, other structures may be utilized in order to provide entry for fuel vapor or fuel air mixture moving along the inner surface of the conduit lip 59 and the inner wall 34 to enter the trap 52 and allow for absorption of the hydrocarbons in the air by the hydrocarbon absorptive material 60.

Additionally, while the filter adapter 30 is shown as having the forward cover 31 and the rear cover 36, the structure may be formed as a single piece or may be two or more pieces to define the filter adapter 30. Still further, additional shapes may be utilized and the depicted embodiment should not be considered limiting. The filter adapter 30 should be sized and shaped to fit at least partially within the outlet end 18 of the filter 12 (FIG. 1) or to otherwise seal thereabout, and should also connect to the air conduit 38 (FIG. 1), with or without a separate coupling, adapter, or the like. A plurality of shapes may be utilized between those two limiting shaped structures.

Figure 6:
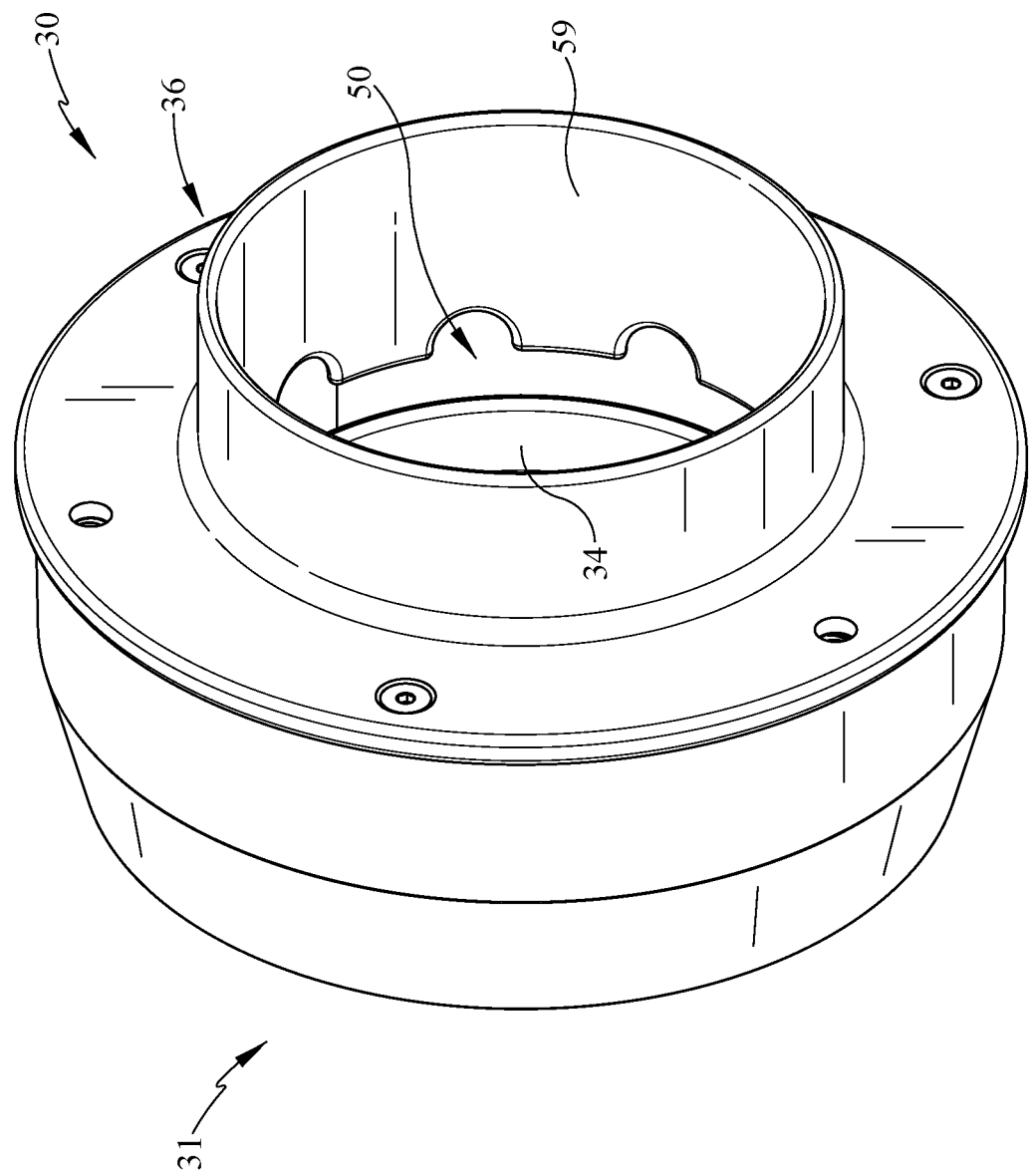
FIG. 6 is a rear perspective view of the filter assembly showing a gap into the hydrocarbon trap.

Referring now to FIG. 6, a rear perspective view of the assembled filter adapter 30 is provided. The view depicts the conduit lip 59 defining a portion of the rear cover 36. Additionally, the gap 50 is shown between the forward edge of the conduit lip 59 and the rear edge of the inner wall 34. The gap 50 therefore allows entry into the trap 52 therein. While the scallops 56 are shown on the conduit lip 59, they may also be located on the inner wall 34 of the forward cover 31.

Figure 7:
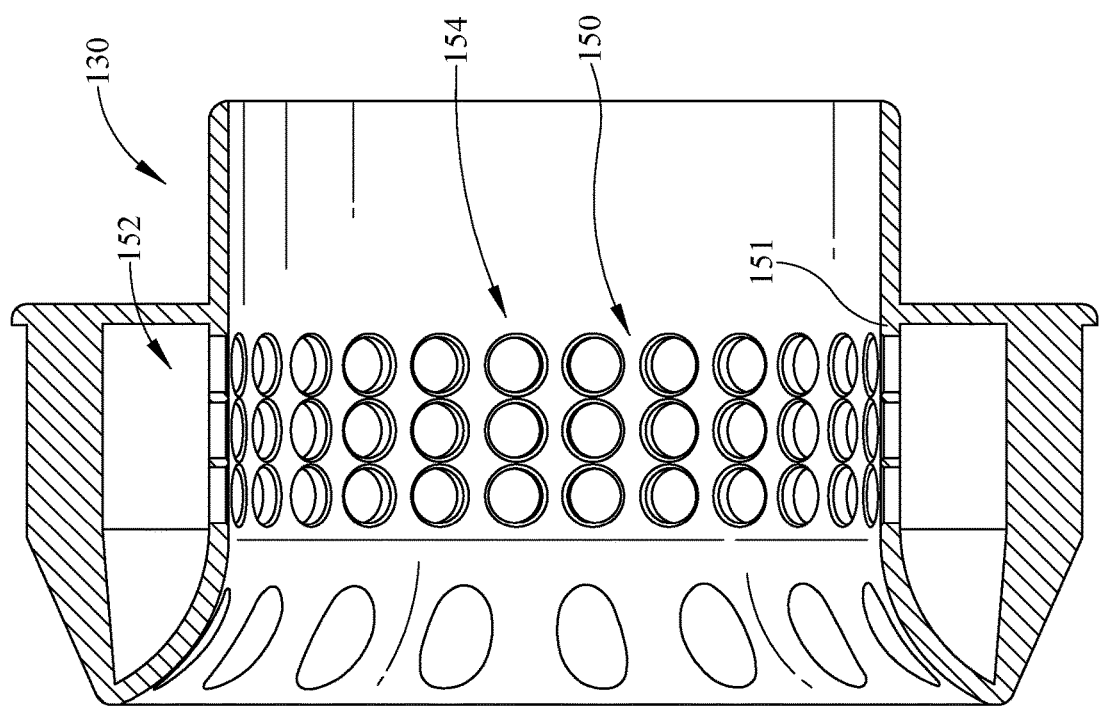
FIG. 7 is a section view of a filter adapter having an alternative gap for entry into a trap.

Referring now to FIG. 7, an alternate embodiment of an alternate air filter adapter 130 is provided in side-sectional view. The air filter adapter 130 is generally similar to air filter adapter 30 and the general description will not be repeated. In the sectional view, the alternative gap 150 is shown formed of a continuous wall 151 and a plurality of apertures 154. The apertures 154 may define a number of rows and columns in the axial and circumferential directions. The rows and columns are shown aligned in one embodiment but alternatively the rows and/or columns may be offset. The apertures 154 are shown of a substantially similar shape, but may also vary in shape. The apertures 154 and/or the gap 150 may be defined by a plurality of hole(s), slot(s), slit(s), pathway(s), or a number of different sized and shaped openings to access the trap 152. As in the previous embodiment, the gap 150 provides access to the trap 152 for the vaporized fuel.

Figure 8:
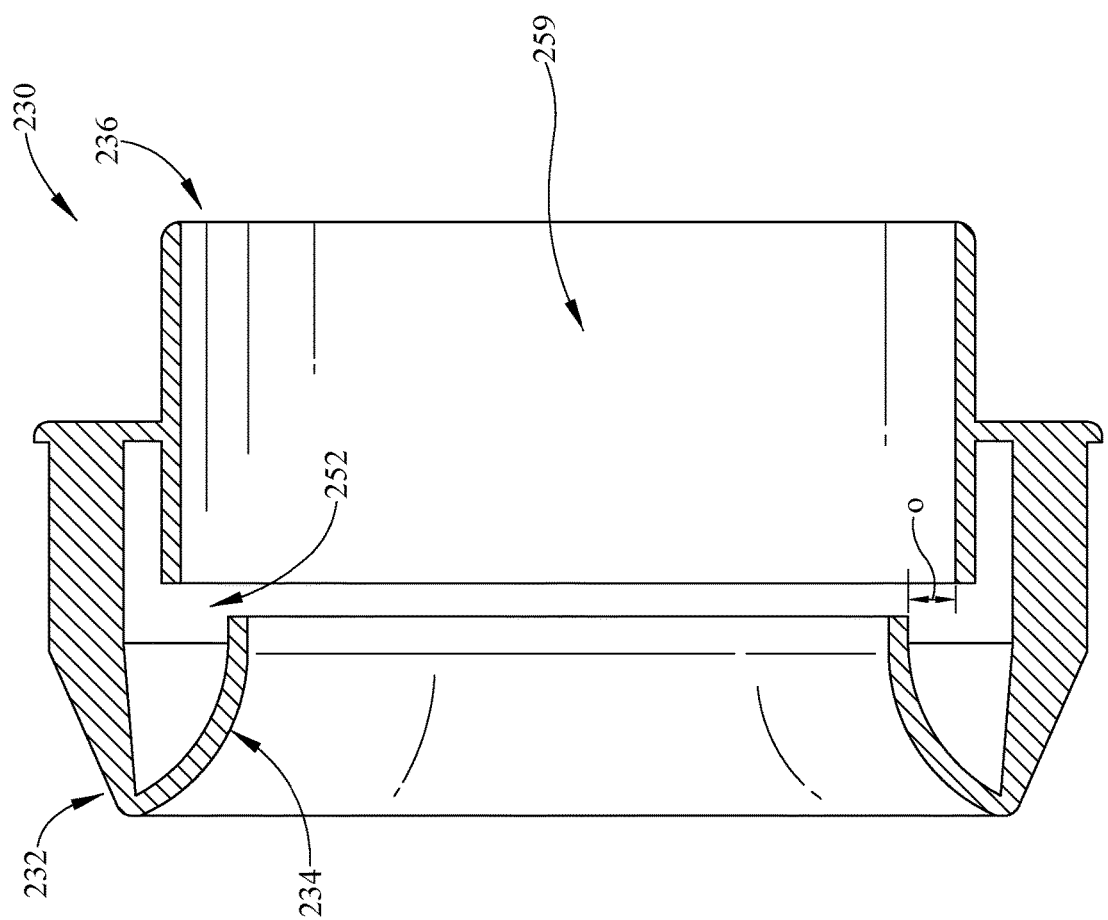
FIG. 8 is a section view of a filter adapter having an alternative gap wherein the walls defining the gap are offset in a radial direction; and, FIG. 9 is a section view of a filter adapter having an alternative asymmetric arrangement wherein one side of the trap is substantially larger than an alternate side.

With reference now to FIG. 8, a side section view of a further embodiment of an air filter adapter 230 is depicted. In this view, the air filter adapter 230 is shown having the inner wall 234 extend inwardly as in the previous embodiment from the outer wall 232. In the instant embodiment, however, the inward end of the inner wall 234 is offset a distance O in a radial direction from the conduit lip 259 of the rear cover 236. Thus, the gap 252 is defined between the offset O of the inner wall 234 and inward area of the conduit lip 259.

With reference now to FIG. 9, a further alternative embodiment is provided of the air filter adapter 330. The filter adapter 330 has a primary difference. The filter adapter 330 as a whole is an asymmetrical piece, unlike the previous embodiments. Instead, the fluid pathway through the filter adapter 330 for air flow is moved in at least one dimension, for example upwardly, so that the trap 352 at the upper end is small but the lower end of the trap 352 is much larger. Accordingly, the gap 350 allows entry to the trap 352 which is larger in at least one area, than others.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A filter adapter for use with an open filter, comprising:
   an outer wall and an inner wall;
   an inlet at one end of the inner wall and an outlet at a second end of the filter adapter;
   a gap located along said inner wall, said gap allowing access to a trap between said inner wall and said outer wall; and,
   an absorptive material disposed in said trap.

2. The filter adapter of claim 1, said inner wall having a first portion and a second portion.

3. The filter adapter of claim 1, further comprising an axial airflow direction between said inlet and said outlet.

4. The filter adapter of claim 1, said trap having an annular shape extending about said inner wall.

5. The filter adapter of claim 1, said inlet having a first diameter and said outlet having a second diameter.

6. The filter adapter of claim 1, further comprising said inlet at a first end of said inner wall and said outlet formed by a rear cover.

7. The filter adapter of Claim 2, further comprising a plurality of scallops in one of said first portion or said second portion of said inner wall.

8. The filter adapter of claim 7, said plurality of scallops disposed on said inner wall adjacent to said gap.

9. The filter adapter of claim 1 further comprising a housing having a forward cover and a rear cover.

10. The filter adapter of claim 9, wherein one of a first portion or a second portion of said inner wall extending from said rear cover.

11. The filter adapter of claim 1 further comprising a transition between said outer wall and said inner wall.

12. The filter adapter of claim 11 wherein said transition may be one of linear or curved.

13. The filter adapter of claim 1 wherein the absorptive material is hydrocarbon absorbing sheet.

14. The filter adapter of claim 1 wherein the gap is formed by walls which are offset in a radial direction.

15. The filter adapter of claim 1 wherein said filter adapter is an asymmetrical in shape.

16. A method of housing an absorptive material, comprising:
   providing an adapter for an air filter having an inlet and an outlet;
   providing a connection location on the adapter for an airflow conduit;
   moving air flow through said air filter and through an interior of said adapter;
   positioning a hydrocarbon absorptive material in said adapter and within a trap;
   absorbing hydrocarbon vapors through a gap disposed along an inner wall of said adapter when an internal combustion engine is turned off.

17. An air intake for an internal combustion engine, comprising:
   an open style filter having a filter media and an outlet for air having passed through said filter media;
   a filter adapter having a forward cover which engages said outlet;
   a trap disposed within said filter adapter between an outer wall and an inner wall wherein a hydrocarbon absorptive material is disposed;
   a gap disposed along said inner wall, said gap allowing access to said trap and said hydrocarbon absorptive material within said trap.

18. The air intake of claim 17, said filter adapter positioned at least partially in said open style filter.

* * * * *